United States Patent

Girny et al.

[11] Patent Number: 5,282,300
[45] Date of Patent: Feb. 1, 1994

[54] BAR TURNING LATHE WITH FIXED POPPET AND RETAKING SPINDLE

[75] Inventors: Gérard Girny; Francois Gensbittel, both of Brunstatt, France

[73] Assignee: F.L.D. Machines Outils S.A., France

[21] Appl. No.: 853,770

[22] PCT Filed: Dec. 6, 1990

[86] PCT No.: PCT/FR90/00887
§ 371 Date: Jun. 5, 1992
§ 102(e) Date: Jun. 5, 1992

[87] PCT Pub. No.: WO91/08852
PCT Pub. Date: Jun. 27, 1991

[30] Foreign Application Priority Data
Dec. 7, 1989 [FR] France .................. 89/16369

[51] Int. Cl.$^5$ .................. B23B 9/04; B23B 13/04
[52] U.S. Cl. .................. 29/27 C; 82/120; 82/124
[58] Field of Search .............. 82/120, 121, 124, 129; 29/27 C

[56] References Cited

U.S. PATENT DOCUMENTS

| | | | |
|---|---|---|---|
| Re. 33,262 | 7/1990 | Link et al. | 82/120 |
| 3,821,835 | 7/1974 | St. Andre et al. | 82/125 |
| 4,413,539 | 11/1983 | Ishizuka et al. | 82/120 |
| 4,597,155 | 7/1986 | Garnett et al. | 82/124 |
| 4,949,443 | 8/1990 | Saruwatari et al. | 82/120 |

FOREIGN PATENT DOCUMENTS

| | | |
|---|---|---|
| 204347 | 7/1959 | Austria . |
| 3626324 | 2/1988 | Fed. Rep. of Germany ... B23B 3/30 |
| 1087028 | 2/1955 | France . |

OTHER PUBLICATIONS

Patent Abstracts of Japan, vol. 13, No. 20 (M-785) (3368), Jan. 18, 1989.
JP, A, 63229201 (Fujitsu Ltd), Sep. 26, 1988 see the whole document.

Primary Examiner—William E. Terrell
Attorney, Agent, or Firm—Davis, Bujold & Streck

[57] ABSTRACT

The present invention relates to a bar turning lathe comprised of a main spindle (10), a first primary tool-holder turret (12) and a second primary tool-holder turret (16) which both carry tools (13, 17). The second turret (16) carries a transfer spindle (19) arranged to take a part (11) from the main spindle (10) that is already partially machined by the tools of the first (12) and second (16) primary turrets. The body of the second primary turret (16) carries an auxiliary turret (20) axially movable and carrying a tool (21) capable of machining the part (11) carried and rotated by the transfer spindle (19). Such an arrangement allows simultaneous machining of a new part (11) carried by the main spindle (10) and a partially machined part (11) carried by the retaking spindle (19).

5 Claims, 5 Drawing Sheets

BAR TURNING LATHE WITH FIXED POPPET AND RETAKING SPINDLE

The machine in question is a bar turning lathe with a fixed poppet comprising a main spindle carrying a part to be machined, a first primary tool holder turret and a second primary tool holder turret. The first primary tool holder turret moves along two orthogonal axes, one of which is parallel to the axis of the main spindle and carries tools arranged to machine the aforementioned part held by the main spindle. The second primary tool holder turret moves along at least one axis parallel to that of the main spindle and carries tools set up to machine the aforementioned part held by the main spindle.

There are already a large number of lathes comprising a primary turret fitted with various tools to machine a part and a secondary turret holding at least one tool, generally a boring or drilling tool to machine this part simultaneously on its end face, in an axial direction.

To machine complex parts such as connectors and fittings which are profiled on both opposing faces, the parts have to be taken up again to undergo a second machining operation.

Such operations are a nuisance and a waste of time, adding to manufacturing costs.

If we consider previous publications describing similar systems, it is worth mentioning the German patent application DE-A-3 626 324 for a lathe with twin turrets and an auxiliary turret. However, in this case, the auxiliary turret is fixed and faces the primary turrets, which excludes any frontal arrangement or simultaneous machining of parts held by the retaking spindle.

This alternative design aims to overcome these drawbacks with a lathe capable of machining both opposiing faces of the part whilst keeping the frontal arrangement of both primary turrets, thus ensuring particulary easy access.

With this aim in mind, the lathe of this design is characterized by the fact that it comprises an auxiliary tool holder turret which moves along an axis parallel to that of the main spindle and is fitted to the second primary turret's support and by the fact that the second primary tool holder turret carries a retaking spindle arranged to pick up a part which is at least partially machined and previously carried by the main spindle. This retaking spindle is set up to present this partially machined part to at least one tool carried by the aforementioned auxiliary tool holder turret.

It is preferable that the retaking spindle be driven by a motor located on the second primary tool holder turret.

In a particularly advantageous arrangement, the first primary tool holder turret carries at least one tool for machining the part and one parting-off tool.

The second primary tool holder turret preferably carries at least one tool for machining the part to be machined carried by the main spindle.

The cutting tool carried by the second primary tool holder turret in preferably a fixed drilling or boring tool.

The auxiliary tool holder turret has the advantage of carrying at least one tool for machining the already partially machined part carried and rotated by the retaking spindle.

The cutting tool carried by the auxiliary tool holder turret is preferably a drilling or boring tool.

The auxiliary tool holder turret can rotate about an axis which is perpendicular to the main spindle axis.

The tool carried by the second primary tool holder turret and the tool carried by the auxiliary tool holder turret are arranged to work simultaneously on a part carried by the main spindle and a part carried by the retaking spindle respectively.

The cutting tool and the retaking spindle have the advantage of being carried by the second primary turret and are set out at an angle of 180° relative to one another.

The second primary tool holder turret preferably carries an arm in which moves in an axial manner along an axis (T) parallel to the axis of the main spindle. This arm carries at least one cutting tool arranged to drill or bore a part rotated by the retaking spindle.

This concept will be better understood by referring to the description and drawings of a standard machining example in which.

Figure 1:
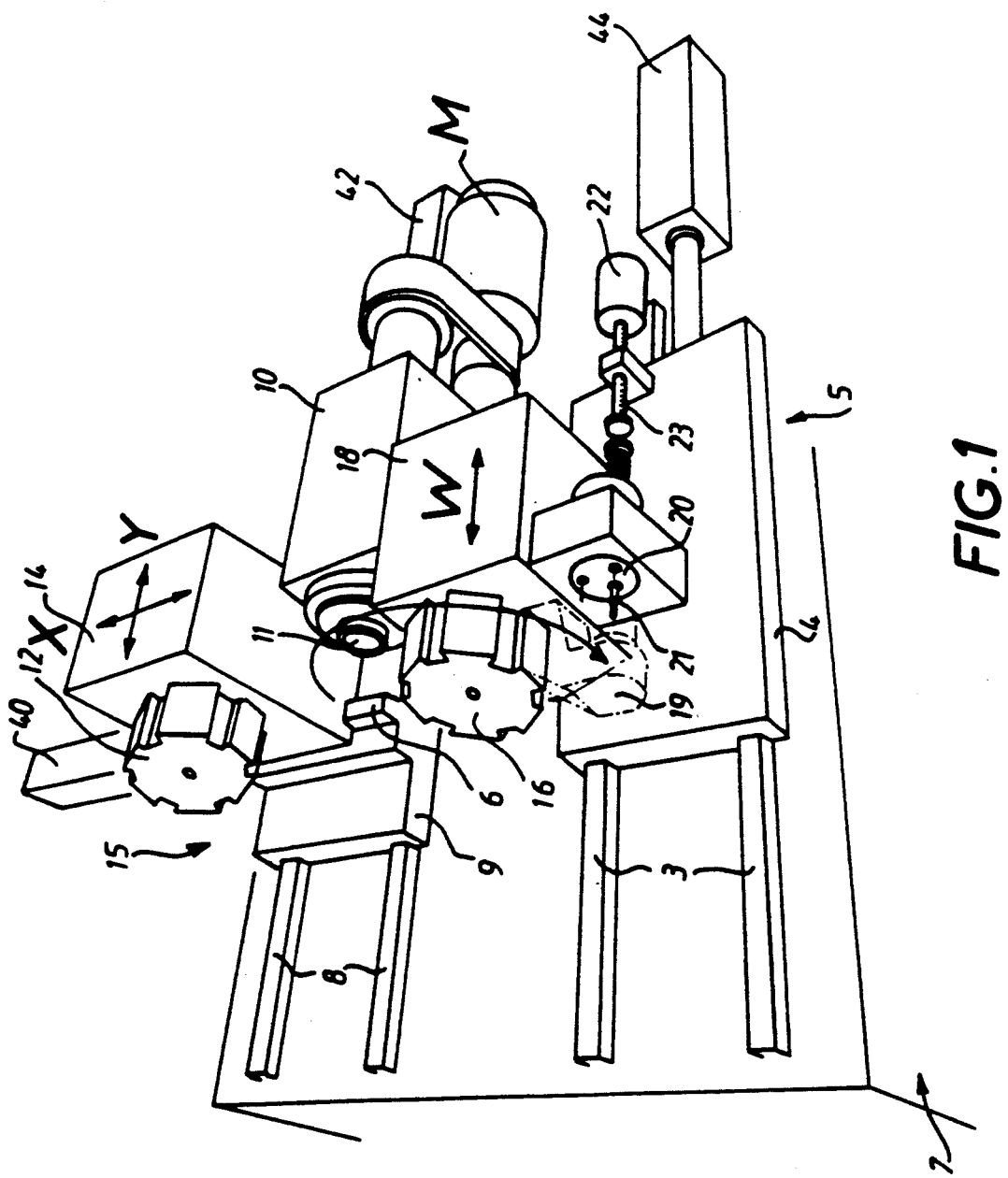
FIG. 1 is a perspective illustrating the primary components of the design of the bar turning lathe.

With reference to FIGS. 1 to 4, the lathe, as shown, is primarily comprised of a main spindle (10) carrying a part (11) to be machined, rotating in the axis of this spindle. Furthermore, it has a first primary turret (12) which carries one or more tools (13) which can be brought into an appropriate position to carry out the machining of the part (11). To this effect, the turret is assembled to a body (14) in which is mounted its rotational axis, and which is carried by a support (15) arranged to allow this turret to move along two perpendicular axes X and Y. The support (15) is composed of a mobile crossslide (9) which can slide in the direction defined by the Y-axis on two parallel slideways (8) mounted on the lathe's base (7) and two slideways (6) fitted to the mobile crossslide (9) which allow the body (14) and consequently the primary turret (12) to move along the X-axis.

Furthermore, it has a second primary turret (16) on which is mounted at least one tool (17), either a drilling or boring tool arranged to work the part's (11) end face.

This second primary turret (16) is assembled to a body (18) which may traverse in the W axis. To this effect, this second primary turret (16) and its body (18) are carried by a support (5) which is comprised of a mobile crossslide (4) which can slide in the direction defined by the W axis on two parallel slideways (3) which are also mounted on the lathe's base (7).

The first primary turret moves along the X axis driven by a motor (40) turning an endless screw (41) coupled to the body (14) of the turret (12). This turret moves along the Y axis driven by a motor (42) turning a screw (43) coupled to the crossslide (9). The second primary turret (16) moves along the W axis driven by a motor (44) turning a screw (45) coupled to the crossslide (5). It is of course understood that these displacements could be performed with other known mechanical means, in particular by hydraulic jacks.

Figure 2:
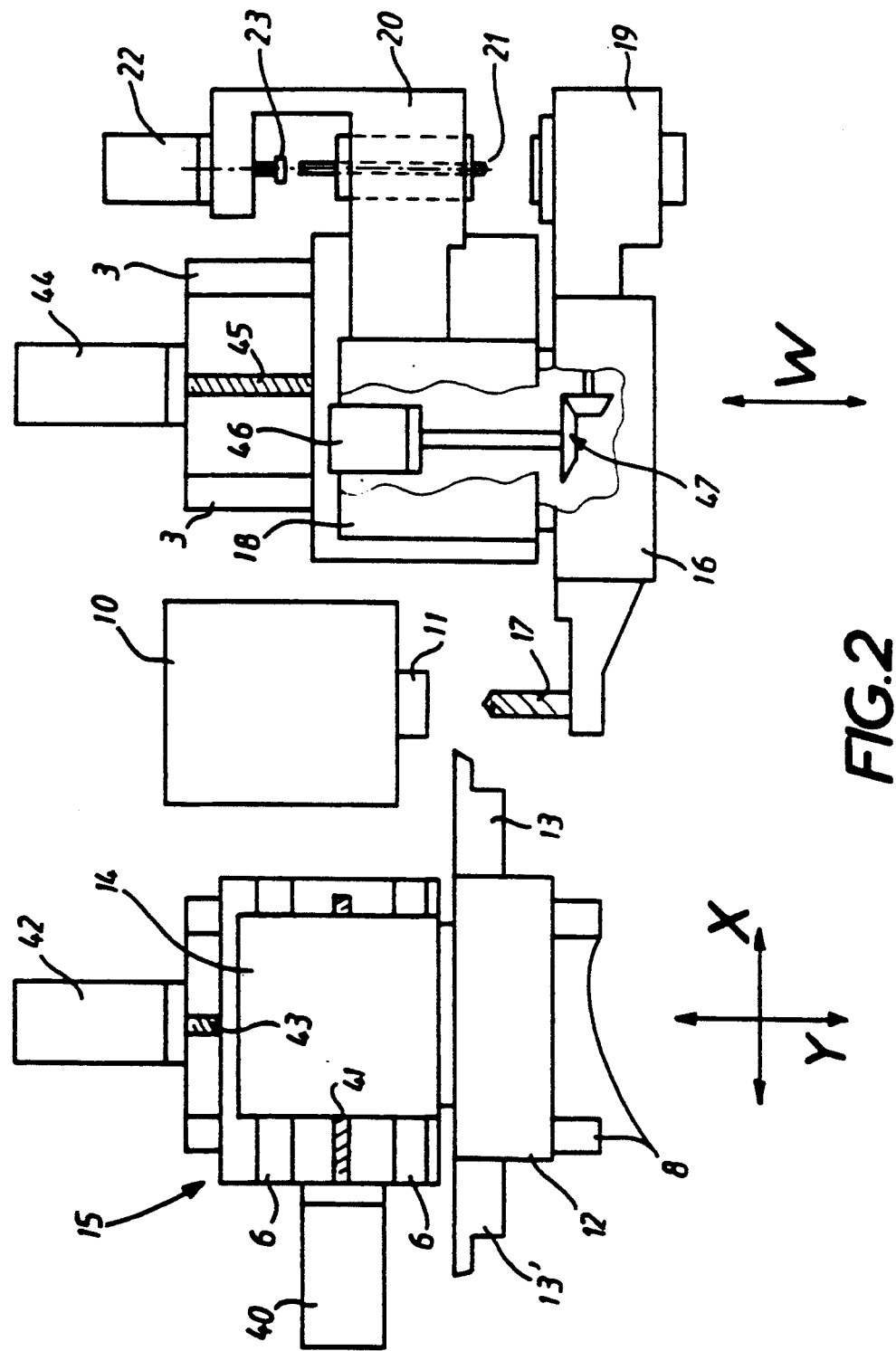
FIG. 2 represents a schematic view with a partial cross-section of the lathe in FIG. 1.

Furthermore, this second primary turret (16) can index 180° to allow the drilling or boring tool to take up the position shown in figure 2 and to then move into an idle position 180° from its previous one to allow a retaking spindle (19), also carried by this turret, to pick up the part (11) when it has been machined by the tools (13) carried by the first primary turret (12).

The drive mechanism for rotating the aforementioned first and second primary turrets are not shown on the Figures.

On the other hand, these figures do show the drive mechanisms of the retaking spindle (19) which rotates to allow machining on the rear face of the part which has been machined beforehand on its front face by the tool (17). These drive mechanisms include a motor (46) mounted in the body (18) and an appropriate transmission (47).

The lathe shown carries an auxiliary tool holder turret (20) arranged to carry at least one tool (21) whose role is to perform the machining on the part's part-off face.

The auxiliary turret (19) is rigidly fixed to the body (18) of the second primary turret (16) so that it moves in parallel with and at the same time as the W axis. A motor (22) combines with a screw (23) to move the tool (21) axially. In practice, the tool (21) is mounted on a turret which carries at least three drilling or boring tools which can be brought into the working position following the indexing of this turret. The tools are in principle fixed but powered tooling could be used. In this latter case, they are rotated by an integral motor.

As FIG. 1 shows quite precisely, the main spindle is rotated by a driving motor M. Work is performed directly on general barstock and this bar is fed by a special device designed for this specific purpose, which is used with the lathe.

Figure 3:
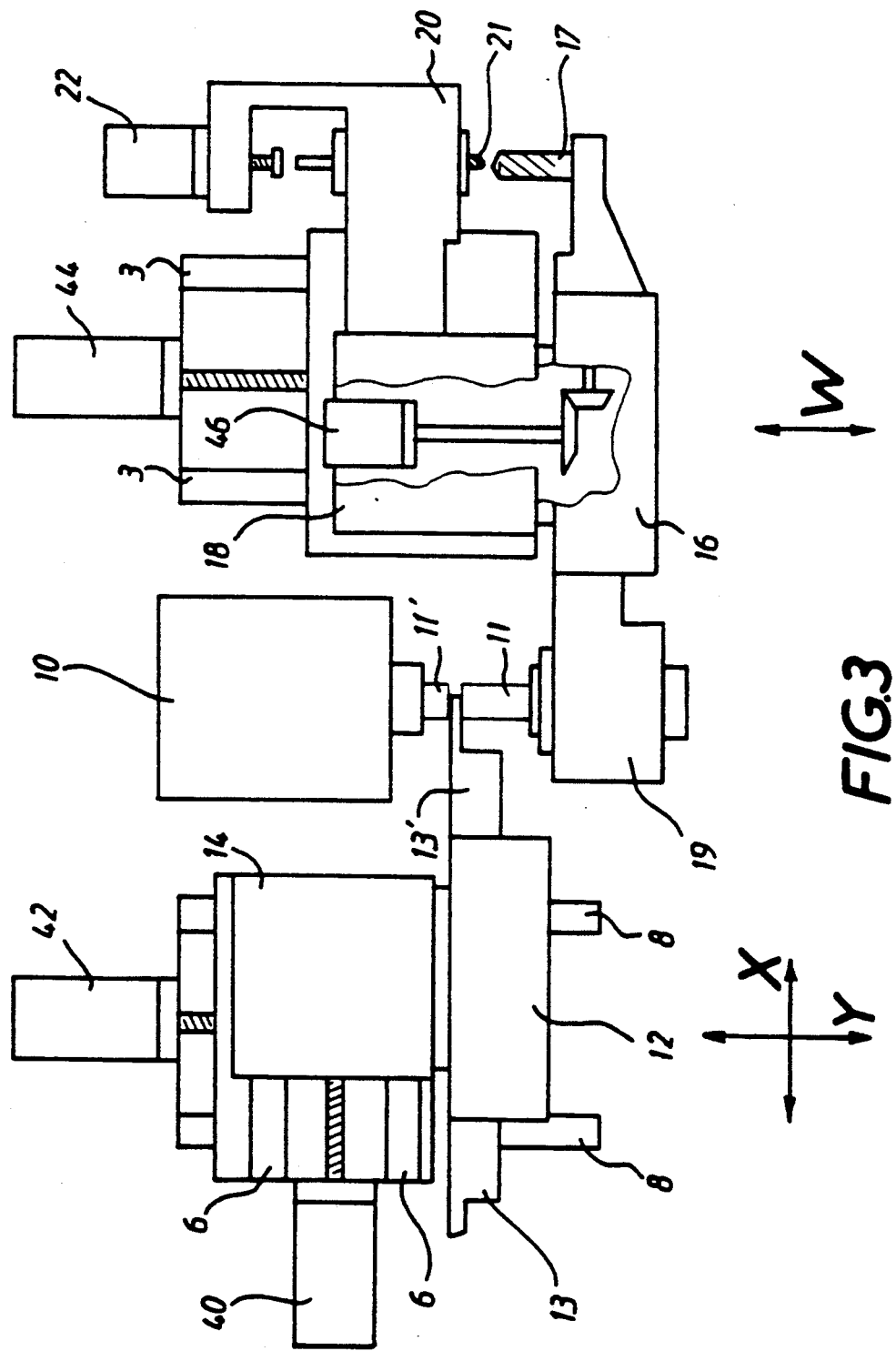
FIG. 3 represents an initial working sequence of the lathe as in FIG. 2.

FIG. 3 shows, in more detail, an initial machining sequence performed by the lathe shown. The part has been previously machined by the tool (13) carried by the first primary turret and simultaneously by the drilling or boring tool (17) and parted off by a parting-off tool (13') carried by the same turret and then picked up by the retaking spindle (19). The drilling or boring tool (17) of the second primary turret is in an idle position after the second primary turret has indexed 180° about the W axis. In the previous phase, this tool was in place opposite the part (11) and carried out the drilling and/or boring operations whilst other machining operations were being carried out by the tool(s) (13).

Figure 4:
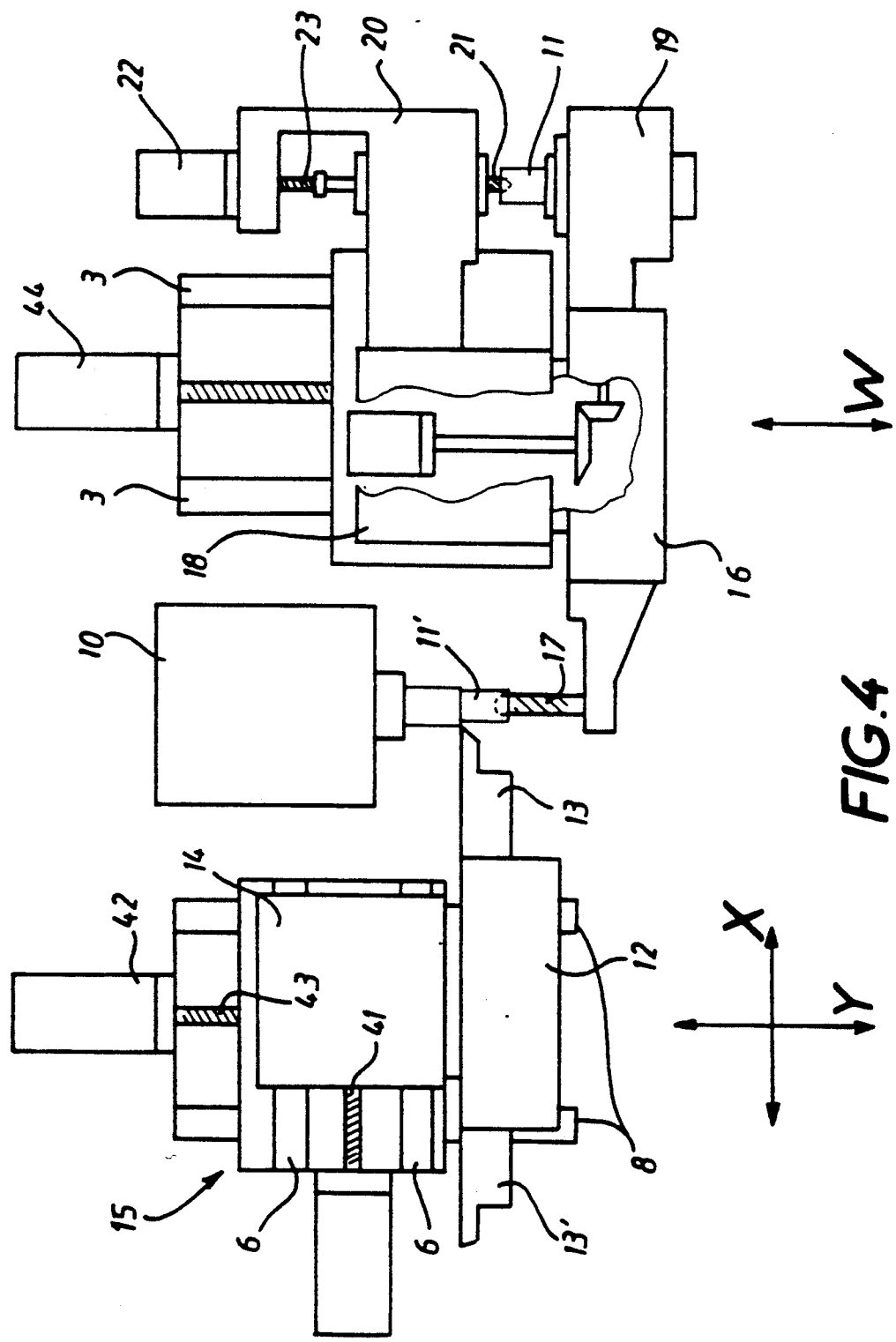
FIG. 4 is a schematic view of a second working sequence with the lathe as illustrated in the previous figures and, FIG. 5 is a partial view of a variation in which the auxiliary turret is mounted laterally.

As FIG. 4 shows, after a further 180° rotation about the W axis, the second primary turret (16) positions the drilling or boring tool (17) up to a new part (11') to be machined. The part which was machined beforehand (11), now picked up by the retaking spindle, is situated opposite the auxiliary turret (20). The following operations can thus be performed simultaneously:

a) machining the part-off face of part (11) using the indexed tool (21) of the auxiliary turret. Part (11) has been previously machined on its other face.

b) the drilling or boring of a new part (11') by the tool (17), c) the machining by the tool (13) of this new part (11').

Apart from the fact that this simultaneous machining offers a considerable number of advantages and enables the lathe's productivity to be improved, notably due to the fact that drilling operations are generally very long, this machine has the advantage of having a frontal configuration, which reduces the amount of space required, making access easy and improving ease of operation of the machine.

Figure 5:
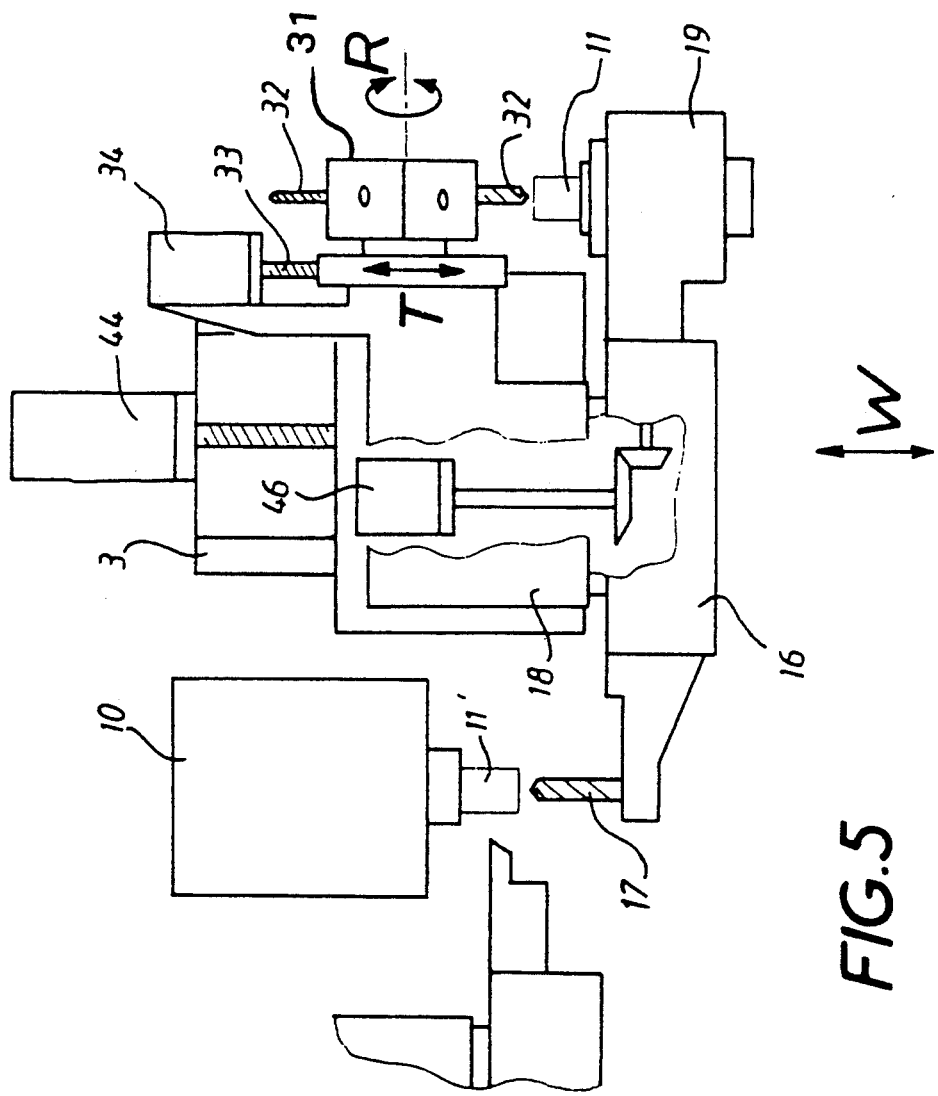

FIG. 5 illustrates a variation according to which the auxiliary turret is set out differently from the one in the previous example. In this variation, the body (18) of the second primary turret (16) carries a mobile crossslide which traverses along the T axis. This crossslide supports the turret (31), arranged to index about an axis R which is perpendicular to the T axis. This turret could be hexagonal and could, for example, carry six tools (32) likely to be brought into position respectively to machine the part-off face of a part (11') which has already been machined on its other face. The displacement along the T axis is performed using an endless screw (33) driven by a motor (34).

A particularly interesting advantage of these types of design is that settings can be easily carried out, access being provided to three sides of the machine by vertically raising a cover (not shown).

This design of machine is not limited to the operations described herein but can be set up according to machining requirements by an experienced operator.

We claim:

1. A lathe with a fixed headstock comprising:
   a main spindle (10), for supporting and rotating a part (11) to be machined, defining a rotational axis; means for rotating said main spindle (10);
   a first primary turret (12) being movable along two orthogonal axes with one of said two orthogonal axes being parallel to said axis of said main spindle (10); means for moving said first primary turret along said two orthogonal axes;
   a second primary turret (16) being movable along an axis parallel to said axis of said main spindle (10); means for moving said second primary turret parallel to said axis of said main spindle;
   a first tool, for machining a said part (11) supported by said main spindle (10), being mounted on said first primary turret (16);
   said second primary turret (16) defining a rotational axis and having a second tool, for machining a said part (11) supported by said main spindle, mounted thereon for rotation about said rotational axis of said second primary turret (16); rotational means for rotating said second primary turret (16) about its rotational axis;
   a take-up spindle (19), for receiving and rotating a said part (11) supported by said main spindle (10), being mounted on said second primary turret (16) for rotation about said rotational axis of said second primary turret (16), said take-up spindle (19) and said second tool being located 180° apart about said rotational axis of said second primary turret (16);
   an auxiliary turret being movable along an axis parallel to said axis of said main spindle (10); means for moving said auxiliary turret parallel to said axis of said main spindle (10); and at least one auxiliary tool mounted on said auxiliary turret for machining a said part received by said take-up spindle (19); and
   said second primary turret being rotatable, about its rotational axis by said rotational means, between a first position in which said take-up spindle (19) is located adjacent said main spindle for receiving a said part from said main spindle, and a second position in which said take-up spindle is located adjacent said auxiliary turret for machining, with said auxiliary tool, a said part received by said take-up spindle (19);

wherein said auxiliary turret is supported by said second primary turret (16) and said auxiliary turret is axially movable, by auxiliary turret means, along an auxiliary axis (T) parallel to said axis of said main spindle.

2. A lathe according to claim 1, wherein said first primary turret (12) supports at least two tools, a first of said at least two tools is a tool for machining a said part (11) and a second of said at least two tools is a tool for cutting a said part (11).

3. A lathe according to claim 1, wherein said second tool is a fixed drilling tool.

4. A lathe according to claim 1, wherein said auxiliary tool is a drilling tool.

5. A lathe with a fixed headstock comprising;

- a main spindle (10), for supporting and rotating a part (11) to be machined, defining a rotational axis; means for rotating said main spindle (10);
- a first primary turret (12) being movable along two orthogonal axes with one of said two orthogonal axes being parallel to said axis of said main spindle (10); means for moving said first primary turret along said two orthogonal axes;
- a second primary turret (16) being movable along an axis parallel to said axis of said main spindle (10); means or moving said second primary turret parallel to said axis of said main spindle;
- a first tool, for machining a said part (11) supported by said main spindle (10), being mounted on said first primary turret (16);

wherein said second primary turret (16) defines a rotational axis and has a second tool, for machining a said part (11) supported by said main spindle, mounted thereon for rotation about said rotational axis of said second primary turret (16); rotational means for rotating said second primary turret (16) about its rotational axis;

a take-up spindle (19), for receiving and rotating a said part (11) supported by said main spindle (10), is mounted on said second primary turret (16) for rotation about said rotational axis of said second primary turret (16), said take-up spindle (19) and said second tool are located 180° apart about said rotational axis of said second primary turret (16);

an auxiliary turret (20) is movable along an axis parallel to said axis of said main spindle (10); means for moving said auxiliary turret parallel to said axis of said main spindle (10); and at least one auxiliary tool is mounted on said auxiliary turret (20) for machining a said part received by said take-up spindle (19); and said second primary turret is rotatable, about its rotational axis by said rotational means, between a first position in which said take-up spindle (19) is located adjacent said main spindle for receiving a said part from said main spindle and a second position in which said take-up spindle is located adjacent said auxiliary turret for machining, with said auxiliary tool, a said part received by said take-up spindle (19) whereby simultaneous machining of a said part supported by said main spindle (10) and said take-up spindle (19) is achievable.

* * * * *